Figure 3:
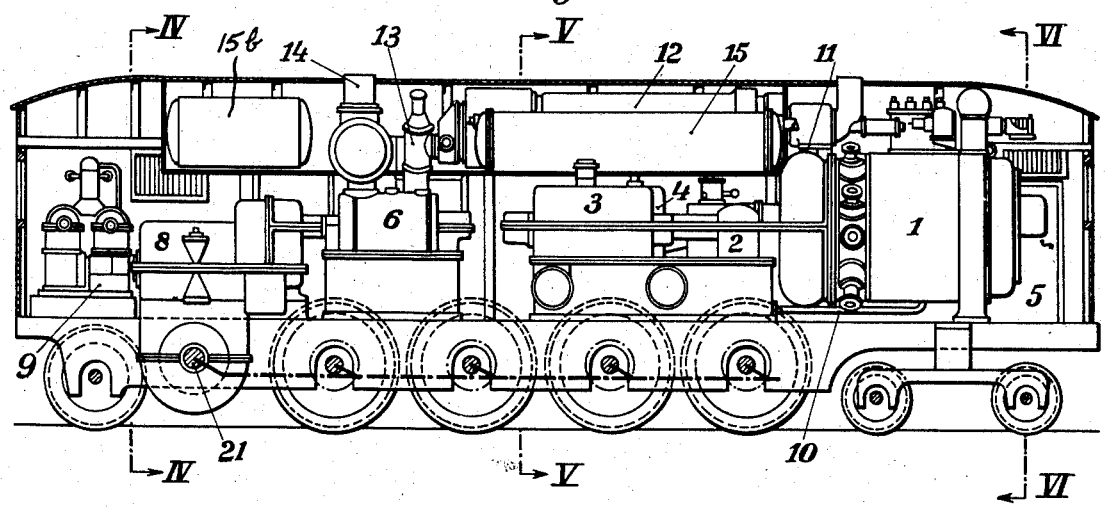

April 3, 1934.  H. HOLZWARTH  1,953,078
PORTABLE EXPLOSION TURBINE POWER PLANT
Filed Jan. 30, 1931  4 Sheets-Sheet 1
Fig. 1
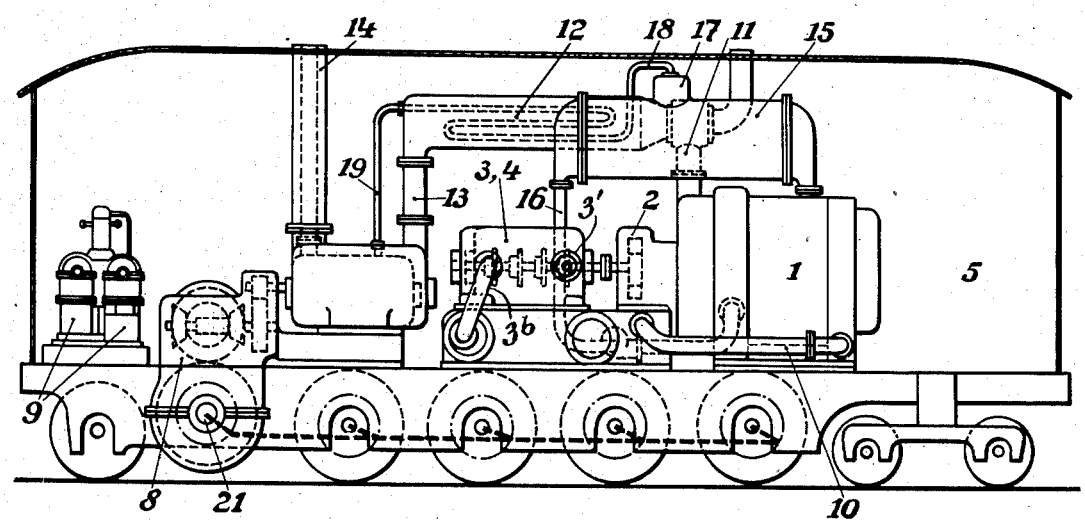
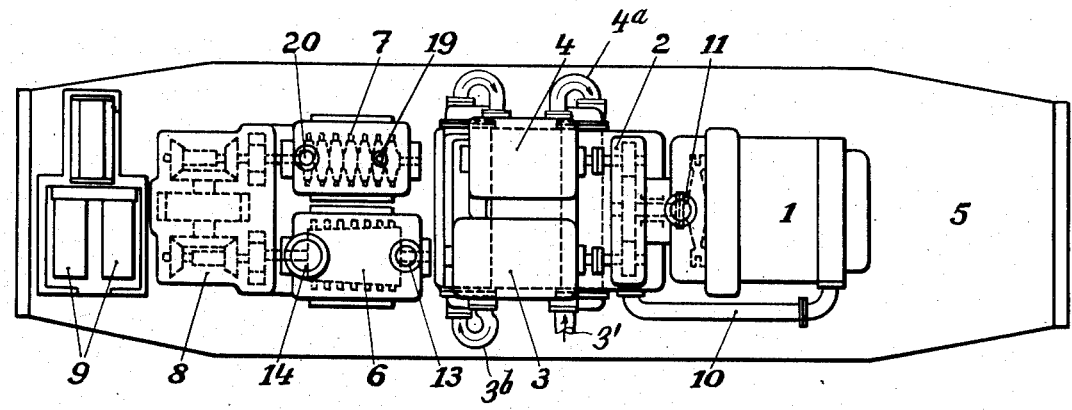
Fig. 2
Inventor
Hans Holzwarth April 3, 1934.  H. HOLZWARTH  1,953,078

PORTABLE EXPLOSION TURBINE POWER PLANT

Filed Jan. 30, 1931  4 Sheets-Sheet 2

Inventor
Hans Holzwarth

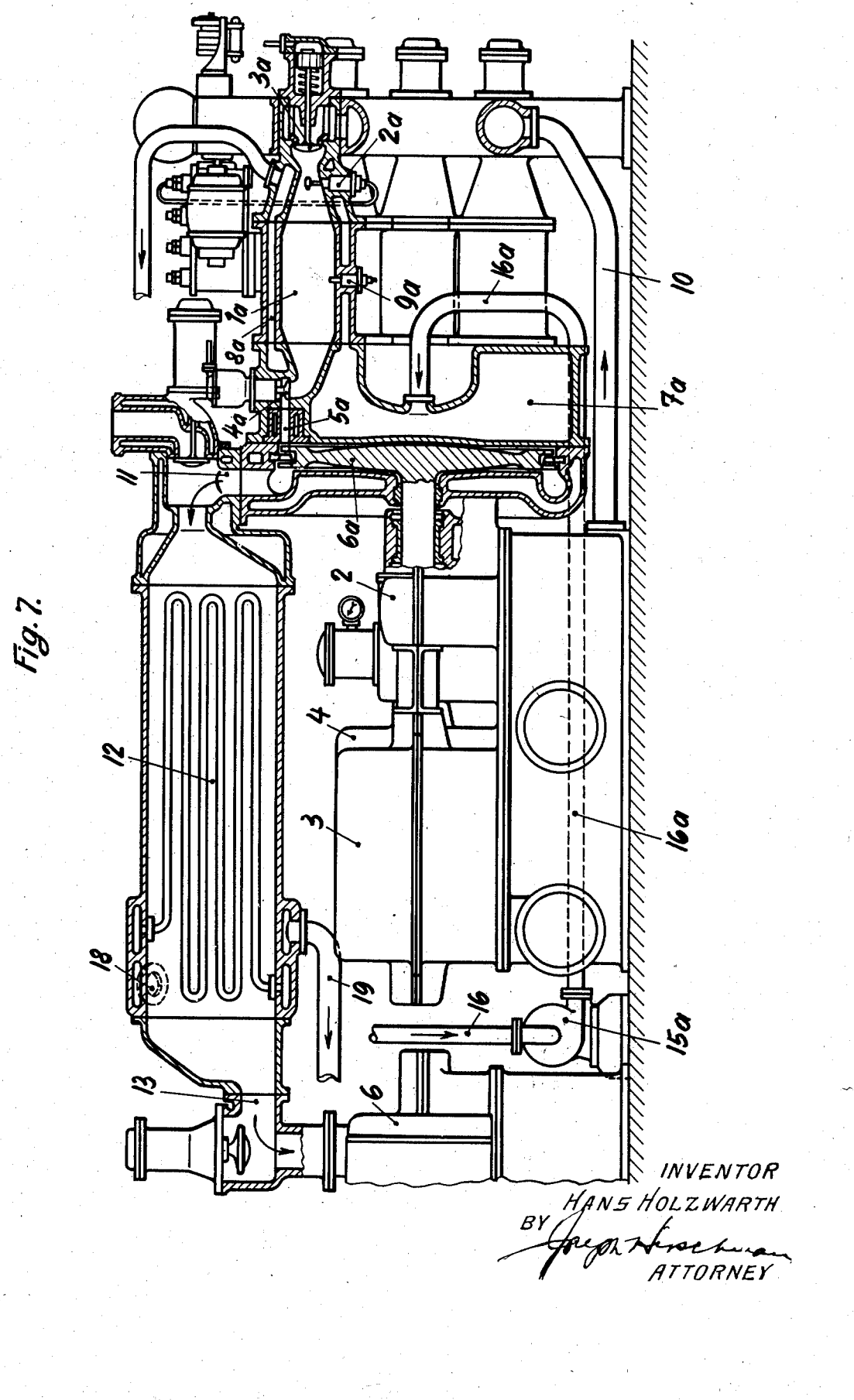

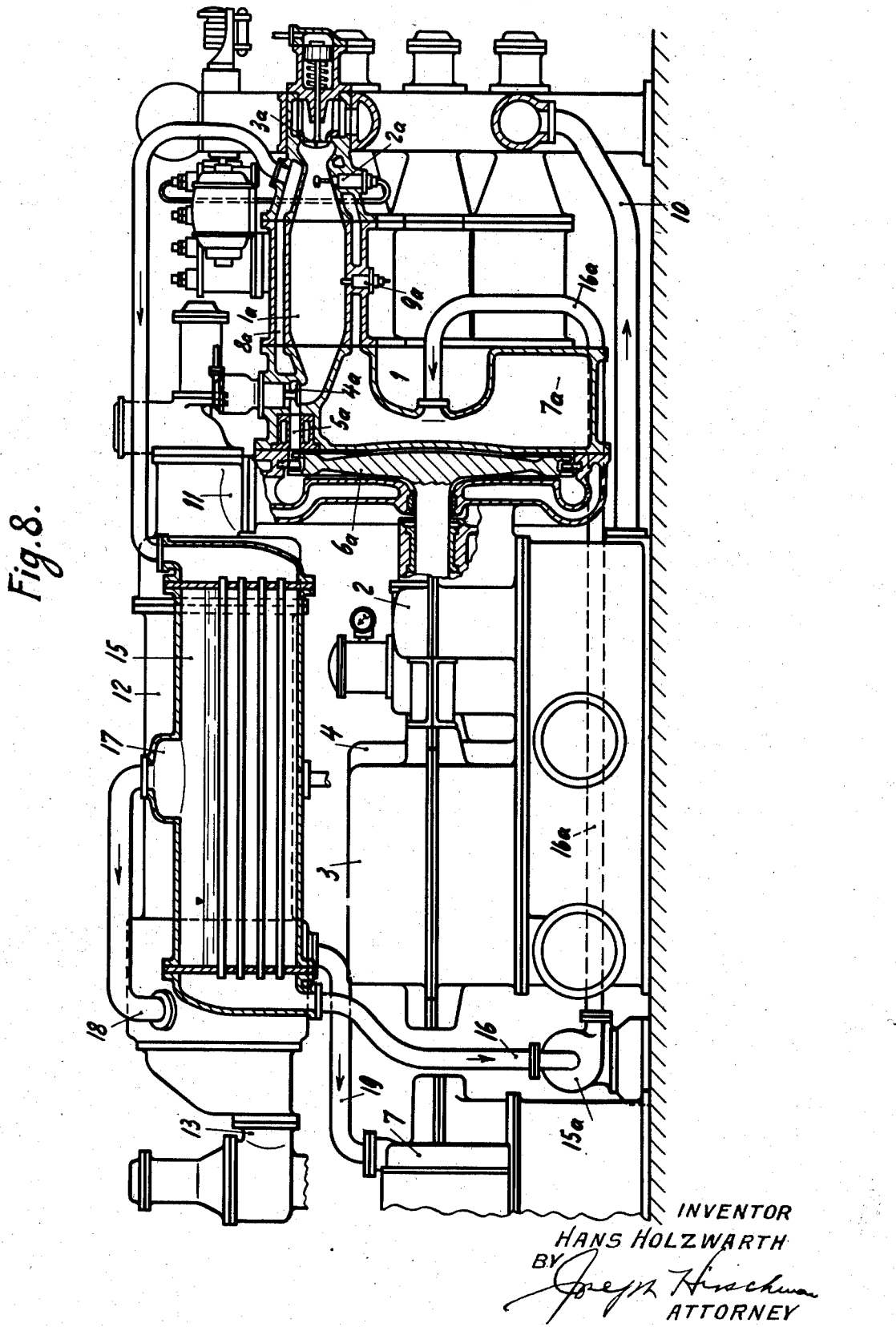

Patented Apr. 3, 1934

1,953,078

UNITED STATES PATENT OFFICE 1,953,078

PORTABLE EXPLOSION TURBINE POWER PLANT

Hans Holzwarth, Dusseldorf, Germany, assignor to Holzwarth Gas Turbine Co., San Francisco, Calif., a corporation of Delaware Application January 30, 1931, Serial No. 512,344
In Germany February 5, 1930

5 Claims. (Cl. 60—49)

The present invention relates to portable power plants of the type which comprise one or more explosion turbines arranged to drive the compressor which feeds combustion supporting air to the explosion chambers of the explosion turbine or turbines, and expansion machines which deliver the available output of the plane. This type of portable power plant has the advantage that the output delivering expansion machines can be made to start under load and are thus particularly suited for the drive of vehicles. The explosion turbine in an arrangement of this kind must thus drive the compressor which produces the necessary compressed air for supporting the explosion in the combustion chambers of the plant. The arranging of the air compressor causes, however, considerable difficulties in plants of the large capacities under consideration when, as for example, with locomotives, the space available for receiving this compressor is limited by the normal outline of the vehicle.

The present invention overcomes these difficulties by utilizing a known subdivision of the compressor into a plurality of stages. According to the invention, the several stages of the compressor are arranged beside each other parallel to the longitudinal axis of the vehicle and are driven in common from the explosion turbine, preferably through a variable transmission. With vehicles in general, that is, with locomotives, ships, airships and so forth, the further condition appears that the distribution of the machine load upon the wheels of the locomotive, upon the base frames of ships, airships, etc., must be as uniform as possible. If the expansion machines which deliver the motive power of the vehicle and are driven by exhaust gases and steam, which machines are preferably in the form of turbines, deliver their outputs through a transmission to a common driving shaft, which in locomotives may be a dummy shaft, and if the compressor and expansion machines are arranged between the explosion turbine and the drive which transmits the available power output of the plant, there is produced a completely symmetrical arrangement which offers the particular advantages that not only do all the machine parts follow each other organically, but the machine parts of lower height leave free a space thereabove which can be used for receiving the heat exchanger for utilizing the waste or excess heat of the explosion turbine. By the organic layout of the machine sections just described, all of the steam, gas and air conduits and likewise the control linkage are greatly shortened, while as a result of the symmetrical arrangement a completely uniform distribution of the weight of the plant over the wheels, base frames, etc., is obtained. If the explosion turbine, by whose regulation the whole drive of the vehicle is controlled, is arranged with its controlled side toward the engineer's cab, then all of the control conduits are of the smallest possible lengths, where they are not entirely dispensed with, because the control elements can be directly engaged. At the driving end of the vehicle, on the other hand, the auxiliary machine is preferably arranged which drives the generator and the control oil pump of the hydraulic control mechanism preferably employed by me. The current delivered by the generator in addition to operating the electric lamps and driving a starting compressor may serve also to drive the control motor of the explosion turbine.

Figure 4:
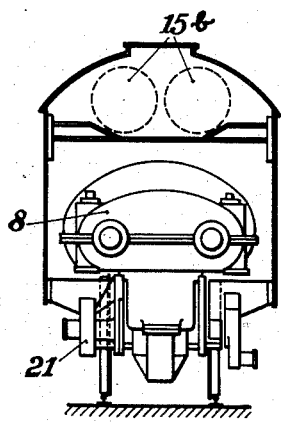
Figure 5:
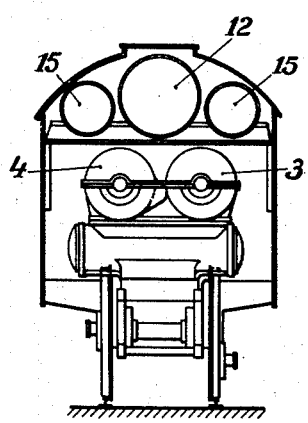
Figure 6:
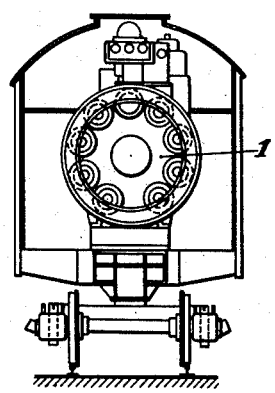

The accompanying drawings show by way of example an embodiment of the invention in the form of a power plant for locomotives. In said drawings, Fig. 1 is a diagrammatic view illustrating a longitudinal section through a locomotive embodying the present invention;

Fig. 2 is a plan view of showing the arrangement of certain parts of the plant;

Figs. 3 to 6 are views illustrating a slightly modified arrangement, Fig. 3 showing an elevation of the locomotive, and Figs. 4 and 5 and 6 being diagrammatic transverse views taken approximately along the lines IV—IV, V—V and VI—VI of Fig. 3; and Fig. 7 shows on an enlarged scale a view through the constant volume explosion turbine and part of the cooling oil circuit of Fig. 3, the superheater and certain other parts being shown in section; while Fig. 8 is a view similar to Fig. 7 but showing the waste heat boiler in section.

The numeral 1 indicates the explosion turbine which through a transmission 2 drives the low pressure stage 3 and the high pressure stage 4 of the compressor. This turbine includes a plurality of explosion chambers 1a (see Fig. 7) which are periodically charged with fuel delivered by injection devices 2a and with air admitted by inlet valves 3a, the mixtures being exploded with the aid of spark plugs 9a or other ignition devices; a nozzle valve 4a being then opened to discharge the gases into a nozzle 5a wherein they are partially expanded and directed against the rotor 6a of the turbine. The low pressure compressor 3 sucks in air from the atmosphere through pipe 3' and delivers the partially compressed air through pipe 3b to the high pressure compressor 4, from which the fully compressed air is discharged by pipe 4a.

According to the present invention the primary machine sections 1–4 are so arranged along the longitudinal axis of the vehicle in advance of the secondary machine section, that the control side of the explosion turbine 1 is directed toward the cab or station 5 of the engineer. The secondary machine section, which is composed of the expansion machines comprising the combustion gas turbine section 6 operated by a continuous stream of combustion gases, and of the steam section 7 in the form of a steam turbine, and of the common drive 8, in the form of a bevel gear transmission, is, in a further development of the invention, so arranged with respect to the primary machine section 1—4, that the compressors 3 and 4 and the expansion machines 6 and 7 are located between the explosion turbine 1 at one end of the vehicle and the drive 8 at the other end of the vehicle. In this way there is obtained a completely symmetrical arrangement of the plant, so that the weight distribution upon the driving wheels is completely uniform, while, on the other hand, the machine sections follow each other organically, so that all connections, conduits and linkages are extremely short. From the arrangement of the explosion turbine 1 with its control side toward the engineer's station 5, there results the further advantage that that element of the plant through whose regulation the whole plant is controlled, lies with its controlled side directly at the engineer's station, so that the control conduits may be made very short and in some instances may become entirely unnecessary, because the control elements can themselves be engaged. Opposite the engineer's cab, upon the driving side of the locomotive, there is located an auxiliary machine aggregate which consists of a Diesel high speed engine 9 operating as a driving engine, the control oil pump and a generator. The control oil pump delivers the pressure oil required for the hydraulic control of the explosion turbine and the other control devices of the plant, while the current delivered by the generator serves for lighting, for driving the starting compressor and for driving the control motor of the explosion turbine.

The operation of the above described plant is as follows:

The explosion turbine 1 is started in the manner above described and drives the compressors 3 and 4. The charging air so produced is conducted to the inlet manifold 10a of the explosion turbine 1 through conduit 10. The explosion gases which have been partially exhausted in the turbine 1 flow to the continuous current turbine 6 through the exhaust pipe 11 and conduit sections 12 and 13. After being further expanded in the turbine 6 the gases are discharged into the atmosphere through pipe 14. As will be clear from Figs. 1 and 7, the explosion turbine 1 is cooled by a current of oil which is circulated by means of a pump 15a and in heated condition flows to a heat exchanger 15 in the form of a boiler, in which the heat abstracted by the oil in the explosion turbine is transferred to feed water, which has preferably been preheated, to convert the same into steam. The so recooled oil is returned to the collecting chamber 7a and the cooling jackets 8a of the turbine 1 by conduits 16 and 16a. The steam is collected in the dome 17 of the boiler 15 and flows through conduit 18 to a superheating coil disposed in the gas conduit 12. The steam is superheated by the gases exhausting from the explosion turbine and is withdrawn by conduit 19 and directed into the steam turbine 7. After performing its work in such turbine the steam is discharged into the atmosphere through pipe 20. The turbines 6 and 7 deliver their power to a dummy shaft 21 through the bevel gear transmission 8. The driving axles of the locomotive are coupled with the shaft 21 in any known manner.

The above description applies both to the construction shown in Figs. 1 and 2 and to that shown in Figs. 3 to 7. Corresponding parts are similarly numbered in the two groups of figures. Fig. 3 is drawn to scale and shows clearly that the explosion turbine 1 arranged at the right end takes on practically the whole profile of the locomotive. On the other hand the heat exchangers 12 and 15 and likewise the compressed air reservoirs 15b can be arranged above the devices having a low height, that is, the transmission 2, the compressors 3, 4, the turbines 6 and 7 and the drive 8. This arrangement is shown more in detail in Figs. 4, 5 and 6. Fig. 5 shows the position of the heat exchangers 12 and 15 above the turbines 3 and 4, and Fig. 4 shows the arrangement of the compressed air reservoirs 15b above the drive 8. The cooling oil circuit (except the boiler 15, which is shown in Fig. 3) is illustrated in greater detail in Fig. 7. It will be evident from Figs. 3-6 that an extremely advantageous utilization of the profile prescribed for railway vehicles can be obtained when the individual machine parts are arranged in accordance with the present invention, whereby optimum conditions are provided for the proper distribution of the weight, for the most advantageous flow of the working media and for the most efficient transmission of the various forces.

I claim:

1. A portable power plant comprising an explosion turbine, a compressor driven thereby, a conduit for conducting compressed air from said compressor to the explosion chambers of the explosion turbine, said compressor comprising a plurality of stages, independently mounted expansion machines geared to the driving axle of such vehicle to deliver their power output thereto and including a gas engine arranged to be operated by the gases exhausting from the explosion turbine and a steam engine, a heat exchanger for generating steam with the aid of heat abstracted from the explosion turbine in the cooling of the latter, and a conduit for feeding such steam to the steam engine, the stages of said compressor being arranged adjacent to each other symmetrically with respect to the longitudinal axis of the vehicle and between the explosion turbine and the expansion machines and driven in common by the explosion turbine.

2. A power plant as set forth in claim 1, wherein said expansion machines comprise turbines, and a transmission for transmitting the power of said turbines to a driven shaft of the vehicle.

3. A power plant as set forth in claim 1, including a transmission between the expansion machines and the driven axle of the vehicle, the arrangement being such that the elements of low height, such as the compressor stages and the expansion machines, are located between the explosion turbine and said transmission.

4. A power plant as set forth in claim 1, including a transmission between the expansion machines and the driven axle of the vehicle, the arrangement being such that the elements of low height, such as the compressor stages and the expansion machines, are located between the explosion turbine and said transmission, said heat exchanger positioned above the compressor stages and the expansion machines.

5. A power plant as set forth in claim 1, wherein the explosion turbine is arranged with its controlled side toward and in the vicinity of the cab of the engineer.

HANS HOLZWARTH.